United States Patent [19]

Peterson et al.

[11] Patent Number: 5,775,713
[45] Date of Patent: Jul. 7, 1998

[54] COLLAPSIBLE GOOSE-NECK VAN TRAILER

[76] Inventors: Thomas W. Peterson; Keith D. Peterson, both of 402 Old Chester Rd., Winnsboro, S.C. 29180

[21] Appl. No.: 548,431

[22] Filed: Oct. 26, 1995

[51] Int. Cl.[6] .................................................. B60P 1/04
[52] U.S. Cl. ........................... 280/441.2; 280/425.2; 280/475; 280/490.1; 414/481
[58] Field of Search ....................... 280/423.1, 425.2, 280/441.2, 475, 490.1, 763.1; 414/481, 537

[56] References Cited

U.S. PATENT DOCUMENTS

| | | | |
|---|---|---|---|
| 2,774,497 | 12/1956 | Martin | 280/441.2 X |
| 2,844,265 | 7/1958 | Clark | 280/441.2 X |
| 2,851,181 | 9/1958 | Thomann | 414/481 |
| 2,872,059 | 2/1959 | Miller | 414/481 |
| 2,952,476 | 9/1960 | Brockman | 280/425.2 |
| 2,968,412 | 1/1961 | Hill | 414/481 |
| 3,255,995 | 6/1966 | Bartlett | 414/350 X |
| 3,292,802 | 12/1966 | Hutchinson | 414/484 |
| 3,292,803 | 12/1966 | Keller et al. | 414/484 |
| 3,883,019 | 5/1975 | Hansen, Jr. | 414/481 |
| 3,894,645 | 7/1975 | Verschage | 414/481 |
| 4,373,857 | 2/1983 | Giles | 414/481 X |
| 4,875,821 | 10/1989 | Oren | 414/481 |

*Primary Examiner*—Brian L. Johnson
*Assistant Examiner*—Avraham Lerner
*Attorney, Agent, or Firm*—Michael A Mann

[57] ABSTRACT

A trailer, as part of a tractor-trailer combination, wherein the trailer is an enclosed van having a collapsible goose neck which connects the trailer to the tractor and provides a ramp into the interior of the van, which is a substantially enclosed structure providing protection for its contents. The gooseneck has a raised and a lowered position and comprises a pair of opposing side plates, a platform, and a tongue. A pair of hydraulic cylinders are provided to lift the van, thus enabling the van to be unhitched from the tractor. A pair of pneumatic cylinders retain the goose neck in its raised position, until a fork lift engages the tongue. After engagement the cylinders are retracted and the goose neck is lowered and once doors carried by the van are opened, access into the interior of the van is available. In the lowered position, the supporting blocks support the trailer with the platform extending approximately parallel to the floor of the van. The side plates support the platform, enabling the tongue to descend from the platform, thus providing a gentle ramp for a forklift to enter the van. In the present embodiment, the trailer optimizes the use of interior space within the van according to external dimensional restrictions as applied by the trucking industry.

18 Claims, 4 Drawing Sheets

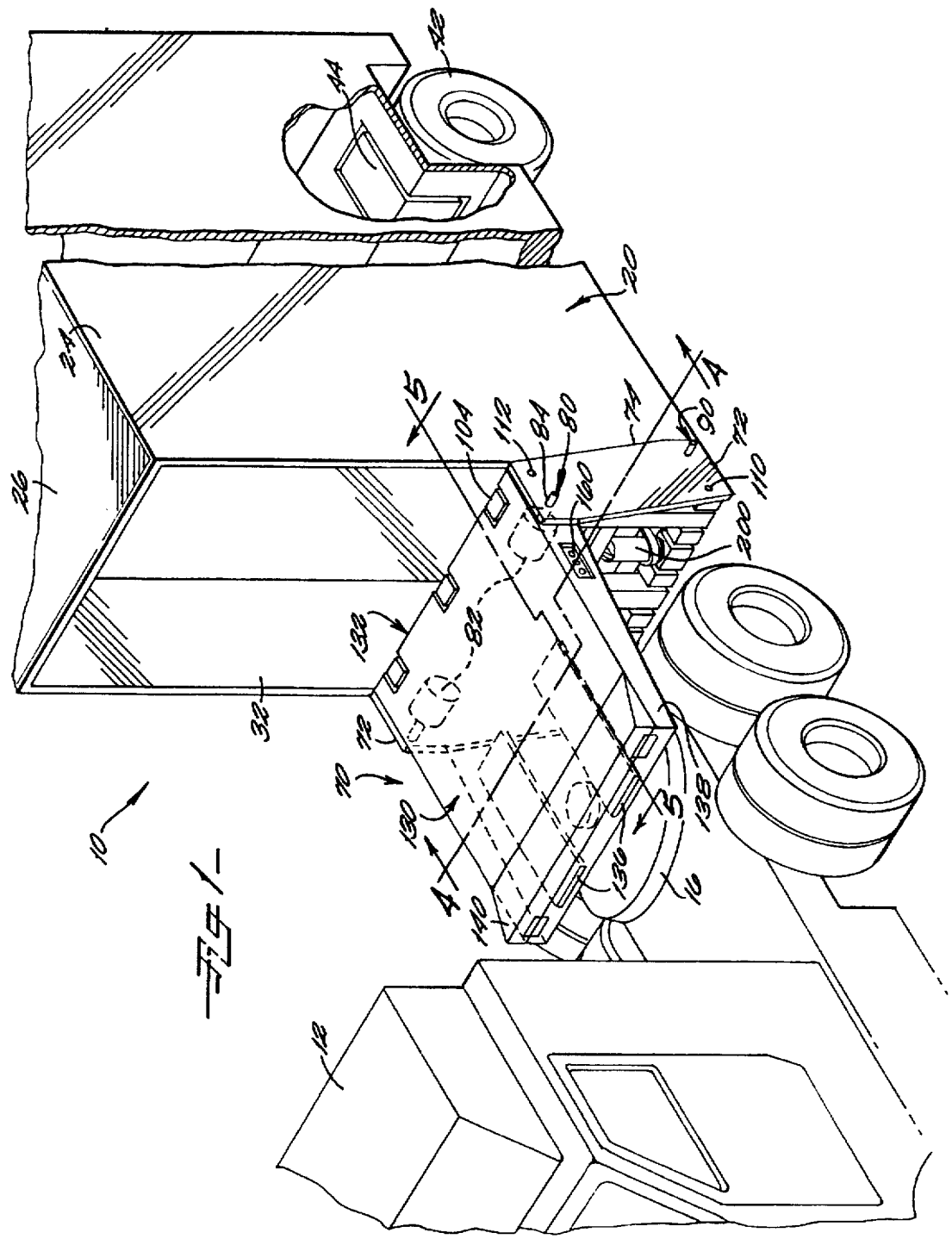

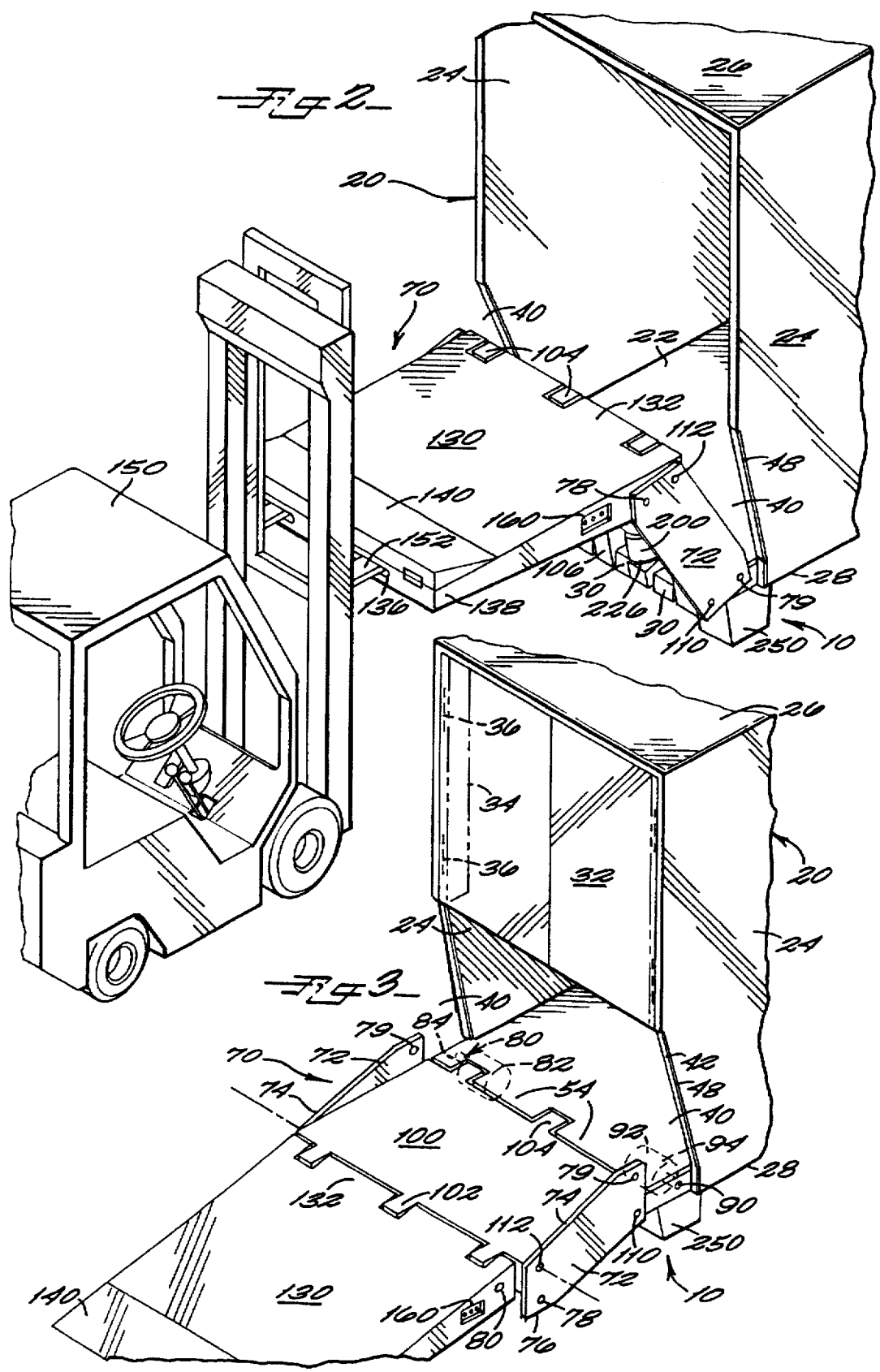

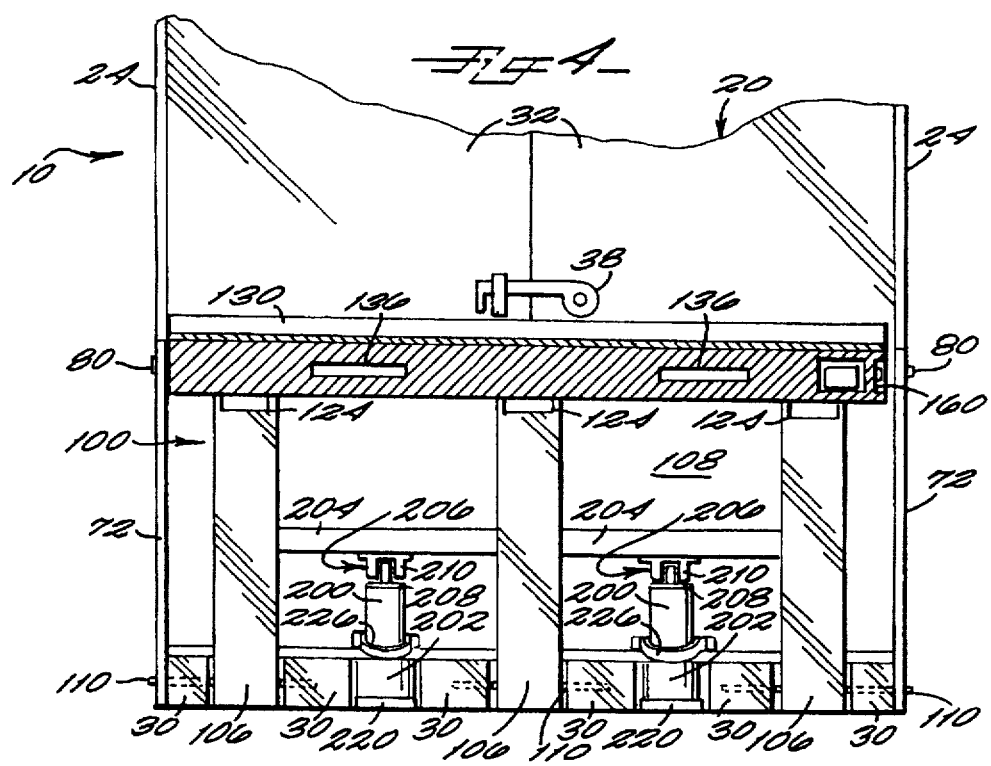
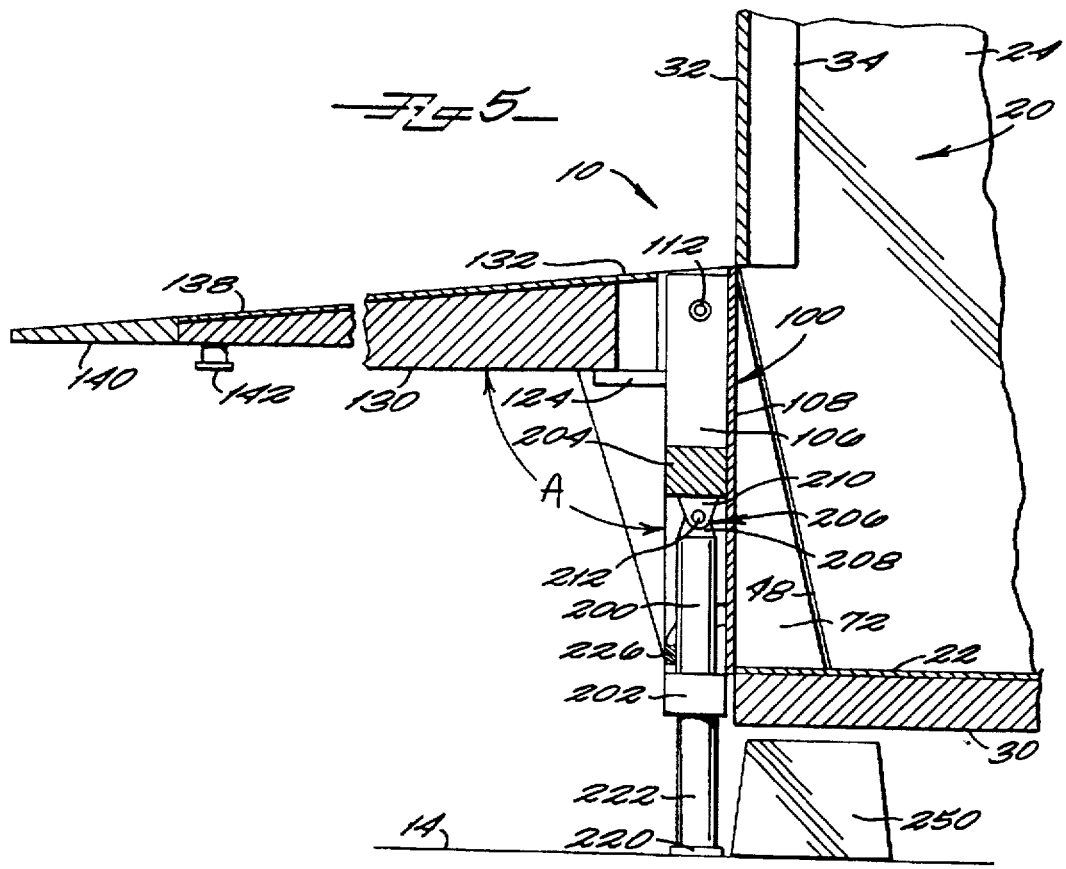

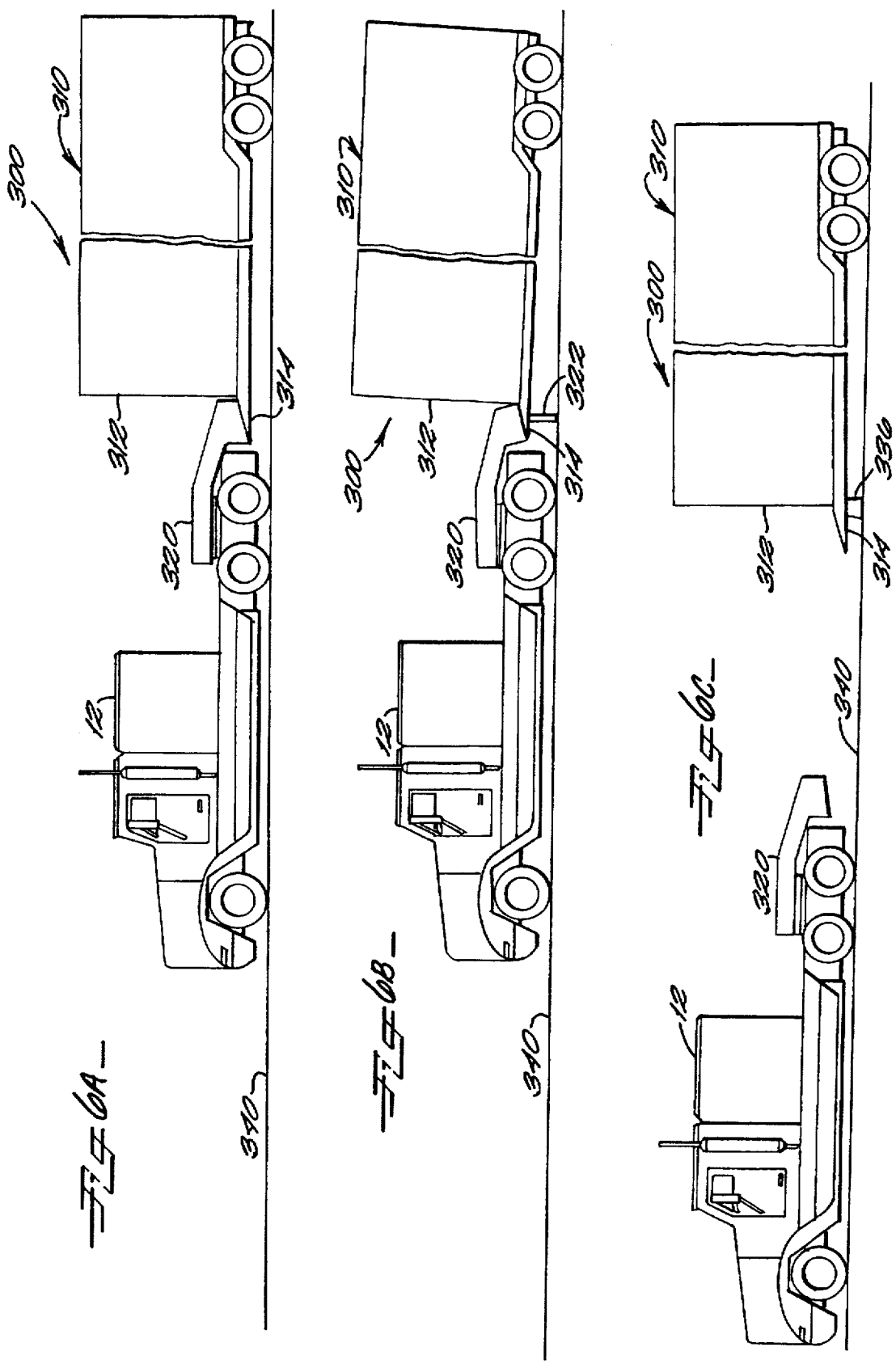

COLLAPSIBLE GOOSE-NECK VAN TRAILER

BACKGROUND OF THE INVENTION

1. Field of the Invention

The present invention relates to front loading tractor-trailers. In particular, the present invention relates to a collapsible goose neck, van type, trailer with front loading capability.

2. Discussion of Background

Tractor-trailer combinations have grown in numbers, size, weight, and load capacities over the years. In fact, by 1985 there were over thirty million trucks or buses registered in North and Central America. Prior to 1983, truck weight and size limits on interstate highways were regulated by the states. However, in 1983 the federal government enacted legislation that established the limits on interstate highways and on thousands of miles of local highways that access interstates or major trucking terminals. The new law permits trailers to have a maximum width of 102 inches (2.6 meters) and a maximum weight of 80,000 lbs. (36,287 kg). Typical box-type trailers have a maximum height of 13 feet-6 inches (4.1 meters). With some of the height being used for ground clearance, wheel clearance, and floor thickness, the interior storage capacity is limited. Therefore, it would be very advantageous to optimize the use of space, thus increasing the amount of cargo the trailer could carry on a given trip and reducing the overall cost for each piece of cargo.

While some materials may be transported on an open or flat bed trailer, other materials may be damaged when exposed to the elements during transportation. Therefore, it is necessary to provide a closed van or box-type trailer or other enclosure to protect these materials and products during shipping.

These box-type trailers typically open from the rear. There are significant disadvantages with rear door box trailers, as discussed in U.S. Pat. No. 4,875,821, issued to Oren. Specifically, a front opening trailer allows access to the cargo area without obstruction by the rear wheel well and without a significant elevation change between the trailer floor and the ground. Consequently, it is necessary to provide a front loading, box-type trailer which protects the transportation cargo and utilizes the maximum interior space for storage and transportation.

SUMMARY OF THE INVENTION

According to its major aspects and broadly stated, the present invention is a collapsible goose-neck trailer for towing by a typical tractor. The trailer comprises an enclosed van with collapsible means carried by the front of the van for attaching the trailer to the tractor. The enclosed van is a box-like structure, typically having an aluminum skin with ribbed members supporting the aluminum skin.

The means for attaching the trailer to the tractor has a raised position and a lowered position. The attaching means comprises a pair of opposing side plates pivotally carried by the van, a platform pivotally carried by the van positioned between the two opposing side plates, and a tongue pivotally attached to the platform. A door is positioned on the front end of the van, which provides access into the interior of the van when the door is open and the attaching means is in the lowered position.

In the raised position, the attaching means permits the trailer and the tractor to be connected for towing. In this position, the platform extends approximately perpendicular to the floor of the van from a bottom pivot point. The side plates also pivot from this bottom pivot point, and engage the sides of the van to form part of the enclosure. Therefore, in the raised position, the van, its doors, the side plates, and the platform substantially enclose the contents of the van, protecting them from outside elements.

There is a pair of hydraulic cylinders carried by the platform extending approximately parallel to the platform. In the extended position, the cylinders raise the floor of the van with respect to the ground, so that a block can be inserted to support the weight of the van when the cylinders are retracted. This block supports the van at a height approximately equal to the normal height of the van when it is attached to a tractor.

There are also two pair of air cylinders, the first being carried by the van and the second being carried by the tongue. These cylinders serve as locking pins preventing the attaching means, including the side plates, tongue, and platform, from pivoting to the lowered position until these cylinders are retracted.

When pivoting to the lowered position, the platform and side plates pivot together until the platform is in a position approximately parallel to the floor of the van, and the edges of the side plates engage the ground. The side plates are positioned and designed such that the platform will stop in its approximately parallel position when the side plates engage the ground. The tongue pivots with respect to the platform, so that it and the platform form a ramp into the interior of the van. The tongue contacts the ground at an incline, thus providing a gradual rise from the ground to the platform. In the preferred embodiment, the tongue has an extension or lip that provides an additional ramp from the ground onto the tongue, thus minimizing the bump that a vehicle ascending or descending the ramp would encounter.

In describing the present invention, the sequence of operation for unloading the trailer best describes the function of the individual elements of the invention and their interaction with each other. Typically, a driver arrives at an unloading site with the tractor-trailer combination. There is a panel on the side of the tongue into which the driver actuates the hydraulic cylinders to extend and lift the floor of the van. The hydraulic cylinders are supplied with fluid carried in the rear of the van and powered by the electricity from the tractor. After the hydraulic cylinders have raised the van, a pair of supporting blocks are inserted between the ground and the van. The hydraulic cylinders are then retracted and the van rests on the blocks, after which the driver disconnects the trailer from the tractor.

When the driver disconnects that trailer and tractor, the electricals and king pin are disconnected, and the tractor is pulled away to perform another task. When the trailer is ready to be unloaded, a forklift pulls up, so that its fork engages the channels within the tongue. The driver, who is unloading the trailer, activates the first and second air cylinders so that they are retracted, allowing the platform, side plates, and tongue to pivot. Once the air cylinders are retracted, the forklift pulls away from the trailer slowly, while lowering its fork, thus allowing the tongue, platform, and side plates to pivot downwardly until the side plates and tongue engage the ground or a lower surface. The tongue, side plates, and platform are now in their lowered position forming a ramp, so that the forklift can enter the trailer and begin unloading the van's contents, once its doors are opened.

An important feature of the present invention is the two positions of the attaching means. In the raised position the attaching means forms part of the door into the van and helps protect the contents of the van from the elements. Additionally, in the raised position, the trailer is connectable to the tractor by the attaching means. In the lowered position the attaching means forms a ramp, providing access for a forklift or other vehicles to enter the van.

Another important feature of the present invention is the enclosed van. The van, being fully enclosed when the attaching means is in the raised position and the doors closed, protects its contents from any outside elements.

Still another important feature of the present invention is the first and second pair of air cylinders. These air cylinders serve as locking pins to prevent the attaching means from pivoting to its lowered position until desired. Furthermore, the cylinders allow someone who is unloading the van to easily actuate the cylinders and lower the attaching means with the use of a forklift or other device.

Yet another important feature of the present invention is the pair of hydraulic cylinders. These cylinders raise the van, so that supporting blocks can support the van at its normal height when the cylinders are retracted and the trailer is disconnected from the van.

Still another important feature of the present invention is the side plates, platform, and tongue. In the lowered position, the side plates contact the ground, thus positioning the platform at an approximately parallel position with relation to the floor of the van. The tongue not only carries the king pin or fifth wheel, thus enabling the trailer to be connected to the tractor, but also provides a gradual rise from the ground to the platform. Therefore, the forklift may withdraw from the trailer a substantial distance before it starts its a gradual descent down the tongue. The same principle applies when the trailer is being loaded and the forklift is carrying cargo into the van.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a trailer shown attached to a tractor according to a preferred embodiment of the present invention;

FIG. 2 is a perspective view of a trailer with a forklift lowering the trailer's attaching means according to a preferred embodiment of the present invention;

FIG. 3 is a perspective view of a trailer shown in the lowered position according to a preferred embodiment of the present invention;

FIG. 4 is a cross-sectional view through the line 4—4 of FIG. 1, according to a preferred embodiment of the present invention;

FIG. 5 is a cross-sectional view through the line 5—5 of FIG. 1, according to a preferred embodiment of the present invention; and FIGS. 6A, 6B, and 6C are side views of a trailer showing a removable goose-neck according to an alternative embodiment of the present invention.

DETAILED DESCRIPTION OF A PREFERRED EMBODIMENT

Referring now to FIG. 1, a trailer 10 according to the present invention is shown connected to a tractor 12. The tractor-trailer combination is of the kind typically referred to as an 18-wheeler, a rig, or a truck. However, the present invention is not limited to 18-wheelers, but includes any tractor and trailer combination in which this invention, as described by the following disclosure, might be adapted.

Trailer 10, in its preferred embodiment, comprises an enclosed van 20 and an attaching means 70 for attaching trailer 10 to tractor 12. Attaching means 70 has a raised position, as shown in FIGS. 1, 4, and 5, and a lowered position, as shown in FIG. 3.

Referring now to FIGS. 1–5, van 20 is a box-like structure having a floor 22, a pair of sides 24, a roof 26, and a front end 28. Van 20 is completely enclosed when attaching means 70 is in the raised position. Floor 22 of van 20 is constructed of ¼ inch steel plate and extends the length and width of van 20. Floor 22 is supported by floor supports 30, which are a series of steel tubes of various sizes extending towards the rear of van 20. Some of floor supports 30 do not have to extend the length of van 20, but should merely provide enough strength to support floor 22, so that floor 22 does not buckle or bend when carrying heavy items.

The rest of van 20, sides 24 and roof 26 is preferably constructed of an aluminum skin supported by a series of ribs (not shown) running vertically along sides 24 and horizontally along roof 26. These ribs are spaced apart along the length of van 20, so that the aluminum skin is sufficiently supported. The thickness of each side 24 and roof 26 should be approximately one and one-half inches (1½") thick or less. If side 24 and roof 26 are much thicker, then their thickness begins to interfere with the amount of cargo area within enclosed van 20. Therefore, it is preferable to minimize the thickness of sides 24, roof 26, and floor 22, so that the interior area of van 20 is maximized. It should be noted that the construction of floor 22, sides 24, and roof 26 are not limited to what is described above, but could be of any suitable design that would retain the function of this invention. For example, sides 24 and roof 26 could be constructed of a fiberglass or other weatherproof material.

In the preferred embodiment, van 20 carries a pair of doors 32 on its front end 28. Doors 32 extend from roof 26 until doors 32 reach attaching means 70, which also functions as a door into the interior of van 20. Doors 32 are similar to "dutch doors" in that they only cover part of the opening when attaching means 70 is in the lowered position. Doors 32 are supported by door supports 34, which are one and one-half inch by three inch (1½"×3") steel tubing running vertically along sides 24 of van 20. Doors 32 and supports 34 carry hinges 36 which allow doors 32 to pivot between an open and closed position. Doors 32 mate with attaching means 70 in its raised position to substantially close front end 28 of van 20. A latch 38 is also positioned on the front of doors 32 permitting doors 32 to be locked, thus preventing access into the interior of van 20, as best seen in FIG. 4.

Sides 24 of van 20 also have a cut-out portion 40 on each side 24. Attaching means 70 engages these cut-out portions 40 when it is in its raised position, as will be described in further detail below.

In the rear of van 20 is an axle and wheel assembly 42 which supports trailer 10. Axle and wheel assembly 42 causes a change in elevation in floor 22 along the length of van 20, which can be seen in the cut-away portion in FIG. 1. Carried proximate to axle and wheel assembly 42 and covered by cover 44 is a hydraulic pump and pneumatic container. The hydraulic pump is powered by electricity from truck 12, while the pneumatic container carries pressurized air which is typically used to activate trailer 10's air brakes, when trailer 10 is disconnected from tractor 12. The interaction of the hydraulic pump and pneumatic container with the other features of trailer 10 will be discussed in detail below.

Attaching means 70 is carried by front end 28 of van 20. Attaching means 70 comprises a pair of opposing side plates 72, a platform 100, and a tongue 130. Platform 100 is positioned between side plates 72, which are both pivotally carried by front end 28 of van 20. Tongue 130 is pivotally carried by platform 100 between side plates 72.

Platform 100 is generally rectangular and extends approximately the width of van 20. Platform 100 also extends approximately perpendicular to floor 22 of van 20 when it is in its raised position. In this position, platform 100 extends part-way up the height of van 20, so that platform 100 and doors 32 close front end 28 of van 20. Platform 100 has a thickness of about five inches (5") and a width of approximately ninety-nine inches (99"), which is the interior width dimension of van 20. Platform 100 is constructed from a series of support tubes 106 which extend from front end 28 of van 20 to tongue 130. Platform 100 has a covering plate 108 positioned over support tubes 106 on the top of platform 100. Support tubes 106 are preferably five by seven inch (5"×7") steel tubes, and covering plate 108 is preferably a quarter inch (¼") steel plate.

Platform 100 has a bottom male end 104 and a top male end 102 which interleave a female end 54 on front end 28 of van 20 and a female end 132 of tongue 130, respectively. A bottom pin 110 pivotally connects female end 54 of van 20 and bottom male end 104, so that platform 100 can pivot between its raised and lowered positions. An upper pin 112 extends through female end 132 of tongue 130 and top male end 102 of platform 100, pivotally connecting the two.

Upper pin 112 and lower pin 110 are preferably two and three-quarter inch (2¾") diameter pins. Upper pin 112 can either extend through the width of female end 132 of tongue 130 and top male end 102 of platform 100, or could be constructed as a series of shorter pins, strategically placed so that each top male end 102 could pivot with its respective female end 132 of tongue 130. Bottom pin 110, however, likely must be constructed from a series of pins, as shown in FIG. 4. Bottom pin 110, in the present embodiment, could not extend substantially through bottom male end 104 of platform 100 and female end 54 of front end 28 of van 20, because the pin would interfere with the movement and rotation of hydraulic cylinders 200.

In a preferred embodiment, hydraulic cylinders 200 comprise two cylinders with four inch (4") diameter pistons having a maximum five inch (5") diameter outside and a square head 202 on the bottom end of hydraulic cylinders 200. It is preferable to supply hydraulic cylinder 200 as a pressure extension and spring retraction cylinder, so that as pressure is bled off, hydraulic cylinders 200 will retract. Hydraulic cylinders 200 are positioned beneath covering plate 108 and attached to cross supports 204 extending perpendicular and between support tubes 106. Cross supports 204 are offset from the bottom of van 20, so that when retracted, hydraulic cylinders 200 do not extend beneath van 20, as shown in FIG. 4. Hydraulic cylinders 200 are pivotally attached to cross supports 204 by a male-female pivot connection 206. Male-female pivot connection 206 comprises a male flange 208 connected to the rear of hydraulic cylinder 200 and a female flange 210 connected to cross supports 204. Male and female flange 208, 210 pivot with respect to each other about a flange pin 212.

Hydraulic cylinders 200 each have a foot 220 attached to a shaft 222, so that when hydraulic cylinders 200 are extended they have a stroke of approximately twelve inches (12"). Hydraulic cylinders 200 are powered by hydraulic fluid from the hydraulic pump located in the rear of van 20. Foot 220 engages a lower surface when hydraulic cylinders 200 are extended, thus raising floor 22 of van 20. When floor 22 of van 20 is raised, a supporting block 250 is inserted beneath van 20. Supporting block 250 is of a sufficient height and construction, so that when hydraulic cylinders 200 are retracted, supporting block 250 supports van 20 at a height equal to when van 20 was supported by truck 12. In the preferred embodiment, van 20 is supported approximately nine inches (9") above lower surface 14; therefore, supporting block 250 should have a height of approximately nine inches (9").

It should be noted that as hydraulic cylinders 200 extend and raise van 20, the angle at which foot 220 of each hydraulic cylinder 200 engages lower surface 14 will change. Furthermore, lower surface 14 may not be flat, thus providing foot 220 with an uneven engagement surface. Consequently, it is necessary to provide hydraulic cylinders 200 with a means for pivoting. Male-female pivot connection 206 allows this pivoting movement, but hydraulic cylinders 200 must be retained and limited to small angular movements, so that hydraulic cylinders 200 do not rotate from beneath van 20, causing van 20 to collapse or to interfere with the pivoting movement of attaching means 70. Therefore, a retaining strap 226 is provided for each hydraulic cylinder 200. Retaining strap 226 is generally a flexible strap or possibly rigid retaining bar that is attached to the underside of covering plate 108. Retaining strap 226 merely allows hydraulic cylinder 200 to pivot a relatively small degree, so that hydraulic cylinder 200 can accommodate the angular change of floor 22 of van 20 and any unstable footing for foot 220. Those skilled in the art will recognize that retaining straps 226 can be modified or adapted in a variety of ways, so that hydraulic cylinders 200 are permitted to pivot; consequently, these modifications are considered within this disclosure.

In the raised position, tongue 130 and platform 100 define an angle A, as shown in FIG. 5. Angle A is typically approximately 90° or slightly less, so that as tongue 130 extends over truck 12, it can be securely attached to truck 12. The angular measurements of angle A are not a rigid requirement of platform 100 and tongue 130. Tongue 130 must merely extend from platform 100, so that tongue 130 can be attached to truck 12. Tongue's 130 width is similar to that of platform 100, and in a preferred embodiment is approximately ninety-nine inches (99"). Additionally, in a preferred embodiment tongue 130 extends away from platform 100 and van 20 approximately ninety inches (90"). However, this is not a rigid dimension, and tongue 130 must merely be long enough so that it extends over truck 12 and is able to be securely attached for towing.

Tongue 130 can be constructed in a variety of different ways so long as its external dimensions remain somewhat the same. Tongue 130, as shown in FIGS. 1–5, is of a solid construction. However, it is contemplated that tongue 130 could be constructed of plates, supports, and tubes, so as to reduce the weight of tongue 130 while retaining the structural strength needed to support trailer 20. Tongue 130 has a triangular cross-sectional shape, as illustrated in FIG. 5, so that in the lowered position, tongue 130 provides a gradual ramp from lower surface 14 to platform 100 and van 20.

There are two channels 136 that extend within tongue 130 from its front end 138, which is the closest to truck 12 when trailer 10 is attached to truck 12. Channels 136 are dimensioned so that the forks 152 of a fork lift 150, as shown in FIG. 2, can engage channels 136. Furthermore, a lip 140 is carried on front end 138 of tongue 130. Lip 140 is pivotally attached to tongue 130, so that when tongue 130 is in the lowered position and engaging lower surface 14, lip 140 serves as a miniature ramp between lower surface 14 and tongue 130. Lip 140 is shown attached by a pair of hinges; however, lip 140 can be attached to tongue 130 in numerous ways known to those skilled in the art, so that lip 140 will function as desired.

On the bottom of tongue 130 is a king pin 142 which enables tongue 130 to be attached to a receiving means 16 on truck 12. King pin 142 is of the type known to those skilled in the art of tractor-trailer combinations and merely provides a secure connection between trailer 10 and truck 12.

Side plates 72 are also pivotally connected to front end 28 of van 20 by bottom pin 110, so that side plates 72 engage the edges of platform 100 and tongue 130. Side plates 72 are also pivotally connected to tongue 130 through upper pin 112. Side plates 72 are approximately one and one-half inches (1½") thick and together with platform 100 and tongue 130, provide a maximum width of one hundred and two inches (102"), which is the maximum allowed by trucking industry regulations. Side plates 72 have a contact edge 74 that matingly engage cutout portions 40 of sides 24, when side plates 72 are in the raised position. Contact edges 74 and cut-out portions 40 are dimensioned, so that when side plates 72 are in the raised position, side plates 72 and sides 24 of van 20 substantially enclose van 20. A sealing means 48 is provided and carried by cut-out portions 40, so that cut-out portions 40 and contact edges 74 are sealed, thus further sealing van 20. Sealing means 48 can be constructed from a variety of materials, including foam or a deformable plastic. Those skilled in the art will realize that there are numerous materials that could be used to provide a seal, as described above.

Side plates 72 also have engaging edges 76 that engage lower surface 14 when side plates 72 of attaching means 70 are in the lowered position. Engaging edges 76 are dimensioned so that when attaching means 70 is in the lowered position and engaging lower surface 14, platform 100 is approximately parallel to floor 22 of van 20, as shown in FIG. 3.

Side plates 72 are pivotally connected to bottom pin 110 and upper pin 112, so that side plates move in tandem with platform 100. Also engaging side plates 72 are a pair of upper locking pins 80 and a pair of lower locking pins 90. Upper and lower locking pins engage side plates 72 in an upper hole 78 and a lower hole 79, respectively. Upper and lower locking pins 80 and 90, retain attaching means 70 in the raised position when locking pins 80 and 90 are extended through holes 78 and 79 respectively. When locking pins 80 and 90 are retracted from holes 78 and 79, attaching means 70 is able to pivot from its raised position to its lowered position.

Lower locking pins 90 comprise a pair of lower pneumatic cylinders 92 carried by front end 28 of van 20 and positioned beneath floor 22. Lower pneumatic cylinders 92 have shafts 94 extending from van 20 which engage lower holes 79 of side plates 72. Lower locking pins 90, when engaged, specifically prevent platform 100 from pivoting with respect to van 20. Upper locking pins comprise a pair of upper pneumatic cylinders 82 carried by tongue 130. Positioned within tongue 130, upper pneumatic cylinders 82 each have a shaft 84 that extends from tongue 130 and engage upper holes 78 of side plates 72. Upper locking pins 80 prevent tongue 130 from pivoting with respect to platform 100, when upper locking pins 80 are engaged.

A panel 160 is carried by tongue 130 which provides an operator means for operating upper and lower locking pins 80 and 90. Upper and lower pneumatic cylinders 82 and 92 are typically two and three-quarter inch (2¾") diameter, shafts 84 and 94 of pneumatic cylinders having a maximum diameter of five inches (5") which are supplied by air pressure in the pneumatic container carried in the rear of van 20. Upper and lower pneumatic cylinders 82 and 92 are preferably pressure retract and spring extension cylinders, with a probable stroke length of about two and one-half inches (2½"). Panel 160 can be either electronically operated, valve operated, or operated by any other method known to those skilled in the art, so that panel 160 will operate upper and lower locking pins 80 and 90. Panel 160 also contains means to operate hydraulic cylinders 200 and preferably comprises a means to slowly bleed off pressure from the hydraulic cylinders 200, so that van 20 will descend slowly onto supporting block 250.

Platform 100 may be provided with a series of stop blocks 124 carried by support tubes 106. Stop blocks 124 prevent tongue 130 from pivoting towards the ground or lower surface 14 in case upper locking pin 90 is inadvertently retracted.

The outside width of van 20 is a maximum of one hundred and two inches (102"), according to trucking industry regulations. Sides 24 of van 20 are approximately one and one half inch (1½") in width, including side plates 72. Therefore, the interior width dimension of van 20 is approximately ninety nine inches (99"). The height of van 20 is approximately thirteen feet, six inches (13'-6") above lower surface 14, with the bottom of van 20 providing a nine inch (9") clearance between it and lower surface 14. Roof 26 has a dimension of approximately one and one half inch (1½"), and floor 22 of van 20 has a dimension of approximately five and a quarter inch (5¼"), including floor supports 30. Therefore, the interior height dimension of van 20 is approximately one hundred and forty-six and a quarter inches (146¼"), twelve feet, two and a quarter inches (12'-2¼"). Consequently, trailer 10 converts substantially all of its interior area into transportation space, including the ability to transport cargo having a height dimension of at least twelve feet (12') and a width dimension of just under ninety nine inches (99").

The interaction of the elements of trailer 10 will be best understood by a detail description of its unloading operation. Typically, a driver or operator will drive the tractor-trailer combination to an unloading site. The driver exits truck 12 and goes to panel 160, where hydraulic cylinders 200 are actuated, lifting front end 28 of van 20 approximately three inches (3"), thus taking the weight of trailer 10 off of truck 12. (See FIG. 5.) Supporting blocks 250 are inserted under van 20, so that it will not interfere with the pivoting of platform 100. Typically, two supporting blocks 250 will be used to support trailer 10. The driver then disconnects the electricals from trailer 10, and subsequently disconnects tractor 12 from trailer 10 and pulls tractor 12 away for use on another job. The driver, by using panel 160, slowly bleeds the pressure off of hydraulic cylinders 200. Hydraulic cylinders 200 will typically begin to bleed when the electricals are disconnected from trailer 10, because they are supplied by fluid from a hydraulic pump carried in the rear of trailer 10, which uses electricity from truck 12. In either case, supporting blocks 250 absorb the weight of trailer 10 and hold trailer 10 at approximately the same height it was when connected to tractor 12, approximately nine (9") inches of clearance with respect to surface 14. In this position, trailer 10 is a stand-alone unit which is securely enclosed, merely waiting to be unloaded or loaded.

To unload trailer 10, an operator driving forklift 150 inserts forks 152 into channels 136 of tongue 130. The operator then accesses panel 160 and retracts upper and lower locking pins 80 and 90. In operation, it is not likely that attaching means 70 would fall to the ground if upper and lower locking pins 80 and 90 were retracted inadvertently or before forklift 150 has engaged channels 136. Generally, the weight of tongue 130, platform 100, and side plates 72 would provide enough friction to retain upper and lower locking pins 80 and 90 in the engaged position until forklift 150 lifted tongue 130, thus absorbing the weight of attaching means 70. Notwithstanding the above, the operator now raises forks 152 of forklift 150 so that upper and lower locking pins 80 and 90 may now retract. Once upper and lower locking pins 80 and 90 have retracted, the operator slowly begins to lower forks 152, and to back forklift 150 away from trailer 10. This movement by forklift 150 pivots attaching means 70 from its raised to its lowered position, as seen in FIGS. 2 and 3. Once in the lowered position, tongue 130, lip 140, and side plates 72 engage lower surface 14, thus forming a ramp into van 20.

Tongue 130, including lip 140, provides a slow rise or slow descent for forklift 150 when it enters and leaves van 20. Furthermore, platform 100 provides an extension of floor 22 so that forklift 150 and its cargo can further clear van 20 before forklift 150 begins its descent. Therefore, attaching means 70 permits forklift 150 to carry cargo that is close in size to the vertical dimensions of the interior of van 20.

In an alternative embodiment of the present invention, as shown in FIGS. 6A-C, a trailer 300 comprises an enclosed van 310 and a removable goose neck 320. FIG. 6A shows the tractor-trailer combination with tractor 12 and trailer 300. Enclosed van 310 is similar to van 20 of the preferred embodiment; however, van 310 is substantially enclosed with doors extending the full height and on front end 312 of van 310. Goose neck 320 also carries hydraulic cylinders 322, which extend through a ramp 314 on front end 312 of van 310. Hydraulic cylinders 322 extend to engage the ground or a lower surface 340, thus raising front end 312 of van 310, as seen in FIG. 6B. By raising van 310 and subsequently lowering van 310 onto support blocks 336, goose neck 320 is detached from van 310. After goose neck 320 is detached, tractor 12 pulls away from trailer 300, leaving trailer 300 for unloading or loading, as seen in FIG. 6C. A portable ramp (not shown) is carried and positioned in front of trailer 300 to provide access into trailer 300. Consequently, trailer 300 is provided with a front-loading, enclosed van 310 to protect its contents, where van 310 is accessible by forklift 150, thus optimizing the maximum space as allowed under trucking industry regulations.

The dimensions disclosed within this disclosure are intended as illustrative and are of a general nature, so that the general construction and scale of the relative elements of the invention can be interpreted. Those skilled in the art will recognize that dimensional changes could be made depending on the application of trailer 10. For example, a trailer adapted for extra-heavy use would need larger diameter pins compared to a trailer adapted for relatively light use. Therefore, the dimensions should not be construed as limiting, but merely illustrative of the teachings of this disclosure.

It will be apparent to those skilled in the art that many changes and substitutions can be made to the preferred embodiment herein described without departing from the spirit and scope of the present invention as defined by the appended claims.

What is claimed is:

1. A trailer having at least one axle and adapted to be towed by a tractor, said trailer for use on a surface, said trailer comprising:

a substantially enclosed van having a floor, an interior, a pair of sides, and a front end;

means carried by said front end of said van for attaching said van to said tractor, said attaching means having a raised and a lowered position, said attaching means attachable to said tractor when said attaching means is in said raised position, said attaching means further comprising a platform pivotally carried by said van, said platform extending approximately perpendicular to said floor of said van when said attaching means is in said raised position, said platform extending approximately parallel to said floor of said van when said attaching means is in said lowered position; and a tongue pivotally carried by said platform, said platform and said tongue being lowerable until said tongue engages said surface when said attaching means is in said lowered position, said tongue having a pair of channels adapted for use by a forklift.

2. The trailer as recited in claim 1, further comprising a pair of opposing plates pivotally carried by said front end of said van, said platform positioned between said opposing plates.

3. The trailer as recited in claim 1, wherein said attaching means further comprises a pair of cylinders carried by said platform having an extended position and a retracted position, said cylinders in said retracted position when said attaching means is in said lowered position, said cylinders engaging said surface when said cylinders are in said extended position.

4. The trailer as recited in claim 1, wherein said attaching means further comprises a pair of opposing side plates pivotally carried by said van, said side plates engaging said surface when said attaching means is in said lowered position.

5. The trailer as recited in claim 1, wherein said attaching means further comprises a pair of opposing side plates pivotally carried by said van, said side plates engaging said surface when said attaching means is in said lowered position and said side plates engaging said sides of said van when said attaching means is in said raised position.

6. The trailer as recited in claim 1, wherein said attaching means further comprises:

a pair of opposing side plates pivotally carried by said van, said side plates engaging said surface when said attaching means is in said lowered position;

a first pair of cylinders carried by said van, said first pair of cylinders preventing said side plates and said platform from pivoting with respect to said van; and a second pair of cylinders carried by said tongue, said second pair of cylinders preventing said tongue from pivoting with respect to said platform.

7. The trailer as recited in claim 1, wherein said attaching means further comprises:

a pair of opposing side plates pivotally carried by said van, said side plates engaging said surface when said attaching means is in said lowered position;

a first pair of cylinders carried by said van, said first pair of cylinders having an extended position wherein said cylinders engage said side plates, said first pair of cylinders retaining said attaching means in said raised position and preventing said side plates and said platform from pivoting with respect to said van when said first pair of cylinders are in said extended position, said tongue having a pair of channels adapted for use with a fork lift;

a second pair of cylinders carried by said tongue, said second pair of cylinders having an extended position wherein said cylinders engage said side plates, said second pair of cylinders preventing said tongue from pivoting with respect to said platform when said second pair of cylinders are in said extended position; and means carried by said van for actuating said first and said second pair of cylinders.

8. The trailer as recited in claim 1, wherein said tongue and said platform define an angle, said angle being not more than 90° when said attaching means is in said raised position.

9. A trailer having at least one axle and adapted to be towed by a tractor, said trailer for use on a surface, said trailer comprising:

a substantially enclosed van having a floor, an interior, a pair of sides, and a front end; and means carried by said front end of said van for attaching said van to said tractor, said attaching means having a raised and a lowered position, said attaching means attachable to said tractor when said attaching means is in said raised position, said attaching means forming a ramp into said interior of said van when said attaching means is in said lowered position, wherein said attaching means further comprises:

a platform pivotally carried by said van; and a tongue pivotally carried by said platform, said tongue having a pair of channels adapted for use by a forklift.

10. The trailer as recited in claim 9, wherein said attaching means further comprises a pair of opposing side plates pivotally carried by said van, said platform carried between said side plates.

11. The trailer as recited in claim 9, wherein said platform extends approximately perpendicular to said floor of said van when said attaching means is in said raised position and approximately parallel to said floor of said van when said attaching means is in said lowered position and said tongue has a first position and a second position, said platform and said tongue defining an angle when said tongue is in said first position, said angle being not more than 90°, said tongue being in said first position when said attaching means is in said raised position, and said tongue being in said second position when said attaching means is in said lowered position, said tongue engaging said surface when said tongue is in said second position.

12. The trailer as recited in claim 9, wherein said attaching means further comprises a pair of opposing side plates pivotally carried by said van, said side plates engaging said surface when said attaching means is in said lowered position.

13. The trailer as recited in claim 9, wherein said attaching means further comprises a pair of side plates pivotally carried by said van, said side plates engaging said sides of said van when said attaching means is in said raised position and said side plates engaging said surface when said attaching means is in said lowered position.

14. The trailer as recited in claim 9, wherein said attaching means further comprises:

a pair of side plates pivotally carried by said van, said side plates engaging said sides of said van when said attaching means is in said raised position and said side plates engaging said surface when said attaching means is in said lowered position;

a first pair of cylinders carried by said van, said first pair of cylinders preventing said pair of side plates and said platform from pivoting with respect to said van; and a second pair of cylinders carried by said tongue, said second pair of cylinders preventing said tongue from pivoting with respect to said platform.

15. The trailer as recited in claim 9, further comprising means for supporting said van when said attaching means is in said lowered position, and said attaching means further comprising:

a pair of side plates pivotally carried by said van, said side plates engaging said sides of said van when said attaching means is in said raised position and said side plates engaging said surface when said attaching means is in said lowered position;

a first pair of cylinders carried by said platform, said first pair of cylinders extendible to engage said surface, said floor of said van raised with respect to said surface when said first pair of cylinders are extended, so that said supporting means can be positioned between said surface and said van;

a second pair of cylinders carried by said van, said second pair of cylinders having an extended position wherein said cylinders engage said side plates, said second pair of cylinders retaining said attaching means in said raised position and preventing said side plates and said platform from pivoting with respect to said van when said second pair of cylinders are in said extended position; and a third pair of cylinders carried by said tongue, said third pair of cylinders having an extended position wherein said cylinders engage said side plates, said third pair of cylinders preventing said tongue from pivoting with respect to said platform when said third pair of cylinders are in said extended position.

16. A trailer having at least one axle and adapted to be towed by a tractor, said trailer for use on a surface, said trailer comprising:

an enclosed van having a floor, an interior, a pair of sides, and a front end, said van having a door in said front end of said trailer that provides access into said interior of said van; and means carried by said front end of said van for attaching said van to said tractor, said attaching means having a raised position and a lowered position, said attaching means forming a ramp into said interior of said van when said attaching means is in said lowered position, said attaching means comprising:

a pair of side plates pivotally carried by said van, said side plates engaging said sides of said van when said attaching means is in said raised position and said side plates engaging said surface when said attaching means is in said lowered position;

a platform pivotally carried by said van and positioned between said side plates, said platform extending approximately perpendicular to said floor of said van when said attaching means is in said raised position, said platform extending approximately parallel to said floor of said van when said attaching means is in said lowered position;

a first pair of cylinders carried by said platform, said first pair of cylinders extendable to engage said surface, said floor of said van raised with respect to said surface when said first pair of cylinders are extended;

a tongue pivotally carried by said platform, said tongue having a first position and a second position, said platform and said tongue defining an angle when said tongue is in said first position, said angle being approximately 90° or less, said tongue in said first position when said attaching means is in said raised position and said tongue in said second position when said attaching means is in said lowered position, said tongue engaging said surface when said tongue is in said second position;

a second pair of cylinders carried by said van, said second pair of cylinders having an extended position wherein said cylinders engage said side plates, said second pair of cylinders retaining said attaching means in said raised position and preventing said side plates and said platform from pivoting with respect to said van when said second pair of cylinders are in said extended position; and a third pair of cylinders carried by said tongue, said third pair of cylinders having an extended position wherein said cylinders engage said side plates, said third pair of cylinders preventing said tongue from pivoting with respect to said platform when said third pair of cylinders are in said extended position.

17. The trailer as recited in claim 16, wherein said trailer further comprises means for supporting said van when said tractor and said trailer are disconnected and after said first pair of cylinders have extended to engage said surface.

18. The trailer as recited in claim 16, wherein said tongue further comprises a king pin to connect said tongue to said tractor.

* * * * *